United States Patent [19]

Ferguson et al.

[11] Patent Number: 4,654,641

[45] Date of Patent: Mar. 31, 1987

[54] FREQUENCY DIVIDER WITH SINGLE RESONANT CIRCUIT AND USE THEREOF AS A TRANSPONDER IN A PRESENCE DETECTION SYSTEM

[75] Inventors: Lucian G. Ferguson, Dunedin; Lincoln H. Charlot, Jr., St. Petersburg, both of Fla.

[73] Assignee: Security Tag Systems, Inc., St. Petersburg, Fla.

[21] Appl. No.: 775,568

[22] Filed: Sep. 13, 1985

[51] Int. Cl.$^4$ .............................................. G08B 13/24
[52] U.S. Cl. ................................. 340/572; 307/219.1; 340/551; 342/27
[58] Field of Search ............................ 340/572, 551; 307/219.1; 343/6.8 R; 363/173, 170, 157; 342/27

[56] References Cited

U.S. PATENT DOCUMENTS

| | | | |
|---|---|---|---|
| 4,298,862 | 11/1981 | Gregor et al. | 340/572 |
| 4,314,373 | 2/1982 | Sellers | 343/6.8 R |
| 4,481,428 | 11/1984 | Charlot, Jr. | 307/219.1 |
| 4,484,184 | 11/1984 | Gregor et al. | 340/572 |
| 4,495,487 | 1/1985 | Kavesh et al. | 340/572 |
| 4,510,489 | 4/1985 | Anderson, III et al. | 340/572 |
| 4,510,490 | 4/1985 | Anderson, III et al. | 340/572 |
| 4,553,136 | 11/1985 | Anderson, III et al. | 340/572 |
| 4,572,976 | 2/1986 | Fockens | 307/219.1 |

FOREIGN PATENT DOCUMENTS 2017454 9/1979 United Kingdom .

OTHER PUBLICATIONS

Mitchell et al., "Magnetoelastic Effects in $Fe_{71}Co_9B_{20}$ Glassy Ribbons" J. Appl. Phys. 50 (3), Mar. 1979, p. 1627;
Modzelewski et al., "Magnetomechanical Coupling and Permeability in Transversely Annealed Metglas 2605 Alloys", IEEE Transactions on Magnetics, vol. MAG-17, No. 6, Nov. 1981, p. 2837;
M. J. Feigenbaum, J. Stat. Phys. 19, p. 25, 1978;
P. S. Linsay, Physical Review Letters, vol. 47, No. 19, pp. 1349-1352, Nov. 1981;

Primary Examiner—Glen R. Swann, III
Attorney, Agent, or Firm—Edward W. Callan

[57] ABSTRACT

A batteryless, portable, frequency divider, consisting of a single resonant circuit including a nonlinear inductor having a core made of amorphous magnetic material; and a capacitance connected in series with the inductor to define a resonant circuit that detects electromagnetic radiation at a first predetermined frequency and responds to said detection by transmitting electromagnetic radiation at a second frequency that is a subharmonic of the first frequency. The resonant circuit may further include a second inductor connected in series with the nonlinear inductor and the capacitance to define the resonant circuit. The core of the nonlinear inductor includes an elongated thin flat ribbon of low coercivity amorphous magnetic material. It has been observed that the resonant circuit exhibits a bifurcated frequency-division characteristic in relation to the amplitude of the detected electromagnetic radiation at the first predetermined frequency, whereby additional frequency divisions occur as the amplitude is increased. This bifurcation characteristic is utilized in a presence detection system that uses a tag containing the frequency divider. The system transmits electromagnetic radiation at the first frequency into a surveillance zone and detects multiple subharmonic frequencies to detect the presence of the tag in the surveillance zone.

38 Claims, 13 Drawing Figures

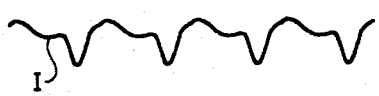
FIG. 3A
FIG. 3B
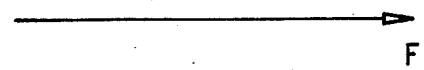
F
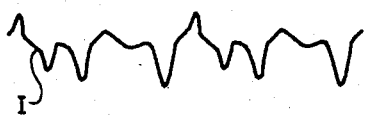
FIG. 4A
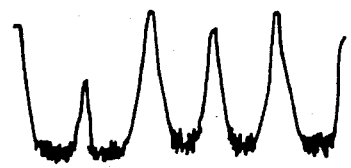
FIG. 4B
F
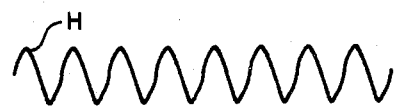
FIG. 5A
FIG. 5B
F

FREQUENCY DIVIDER WITH SINGLE RESONANT CIRCUIT AND USE THEREOF AS A TRANSPONDER IN A PRESENCE DETECTION SYSTEM

BACKGROUND OF THE INVENTION

The present invention generally pertains to frequency dividers and is particularly directed to an improved frequency divider for use as a transponder in a presence detection system.

A presence detection system utilizing a frequency divider as a transponder is described in United Kingdom Patent Application No. 2,017,454. Such system includes a transmitter for transmitting a scanning signal at a first frequency in a surveillance zone; a transponder including an active frequency divider for detecting electromagnetic radiation at the first frequency and for transmitting a presence signal in response thereto at a second frequency that is a sub-harmonic of the first frequency; and a receiver for detecting electromagnetic radiation at the second frequency to thereby detect the presence of the transponder in the surveillance zone. The electronic tags that the transponders are contained within are attached to articles of which detection is desired for enabling detection of the presence of such articles in the surveillance zone. Such presence detection systems are useful for detecting shoplifting, as well for other applications.

A few examples of such other applications include detecting the presence of a person or vehicle carrying a transponder in a surveillance zone; detecting the presence of articles bearing transponders within a surveillance zone along an assembly line; and detecting the presence of keys attached to transponders in a surveillance zone at the exit of an area from which such keys are not to be removed.

The transponder is encased in a small tag that can be attached to an article in such a manner that it cannot be removed from the article without a special tool. When used in a shoplifting detection system, a sales clerk uses a special tool to remove the tag from the merchandise that is paid for; and the surveillance zone is located near the doorway for enabling detection of articles from which the tags have not been removed.

The transponder described in the aforementioned patent application includes a complex frequency divider that must be powered by an expensive long-life miniature battery.

A frequency divider that may be operated without a battery or any external power supply and is suited for use as a transponder in a presence detection system is described in U.S. Pat. No. 4,481,428. Such frequency divider includes a first circuit that is resonant at a first frequency for receiving electromagnetic radiation at the first frequency; a second circuit that is resonant at a second frequency that is a subharmonic of the first frequency for transmitting electromagnetic radiation at the second frequency; and a semiconductor switching device having gain coupling the first and second circuits for causing the second circuit to transmit electromagnetic radiation at the second frequency solely in response to unrectified energy at the first frequency provided in the first circuit upon receipt of electromagnetic radiation at the first frequency.

SUMMARY OF THE INVENTION

The present invention provides an improved portable, batteryless, frequency divider that is useful as a transponder in a presence detection system. The improved frequency divider of the present invention is less complex and less expensive than the frequency divider described in the aforementioned U.S. Pat. No. 4,481,428.

The batteryless, portable, frequency divider, of the present invention consists of a single resonant circuit including a nonlinear inductor having a core made of amorphous magnetic material; and a capacitance connected in series with the inductor to define a resonant circuit that detects electromagnetic radiation at a first predetermined frequency and responds to said detection by transmitting electromagnetic radiation at a second frequency that is a sub-harmonic of the first frequency.

In one preferred embodiment of the frequency divider, the resonant circuit further includes a second inductor connected in series with the nonlinear inductor and the capacitance to define the resonant circuit and having a coil that is positioned so that the second inductor is not mutually coupled to the nonlinear inductor.

The resonant circuit may consist of either the nonlinear inductor and the capacitance or the nonlinear and second inductors and the capacitance.

In a preferred embodiment of the the frequency divider wherein the core of the nonlinear inductor includes an elongated thin flat ribbon of low coercivity amorphous magnetic material, it has been observed that the resonant circuit exhibits a bifurcated frequency-division characteristic in relation to the amplitude of the detected electromagentic radiation at the first predetermined frequency, whereby additional frequency divisions occur as the amplitude is increased. This bifurcation characteristic is utilized in a preferred embodiment of a presence detection system according to the present invention that uses a tag containing such embodiment of the frequency divider.

Additional features of the present invention are described with relation to the description of the preferred embodiments.

BRIEF DESCRIPTION OF THE DRAWING

FIG. 3A shows a waveform H of the electromagnetic radiation at the first predetermined frequency detected by the nonlinear inductor at a first amplitude of said detected electromagnetic radiation and a waveform I of the current flowing in the frequency divider of FIG. 1A when said first amplitude of electromagnetic radiation at the first frequency is detected by the nonlinear inductor.

FIG. 3B shows the frequency spectrum for the electromagnetic radiation transmitted by the frequency divider of FIG. 1A in response to detection of electromagnetic radiation of the first amplitude as shown in FIG. 3A.

FIG. 4A shows a waveform H of the electromagnetic radiation at the first predetermined frequency detected by the nonlinear inductor at a second amplitude of said detected electromagnetic radiation greater than that shown in FIG. 3A and a waveform I of the current flowing in the frequency divider of FIG. 1A when said second amplitude of electromagnetic radiation at the first frequency is detected by the nonlinear inductor.

FIG. 4B shows the frequency spectrum for the electromagnetic radiation transmitted by the frequency divider of FIG. 1A in response to detection of electromagnetic radiation of the second amplitude as shown in FIG. 4A.

FIG. 5A shows a waveform H of the electromagnetic radiation at the first predetermined frequency detected by the nonlinear inductor at a third amplitude of said detected electromagnetic radiation greater than that shown in FIG. 4A and a waveform I of the current flowing in the frequency divider of FIG. 1A when said third amplitude of electromagnetic radiation at the first frequency is detected by the nonlinear conductor.

FIG. 5B shows the frequency spectrum for the electromagnetic radiation transmitted by the frequency divider of FIG. 1A in response to detection of electromagnetic radiation of the third amplitude as shown in FIG. 5A.

DESCRIPTION OF THE PREFERRED EMBODIMENTS

Figure 1A:
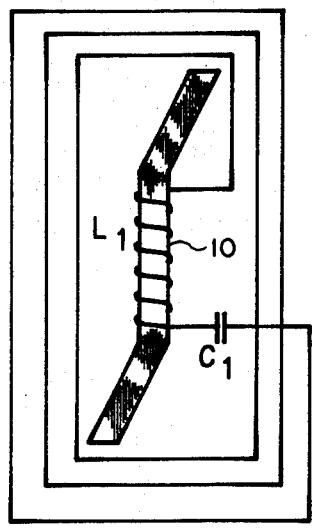
FIG. 1A illustrates one preferred embodiment of the frequency divider of the present invention.
Figure 1B:
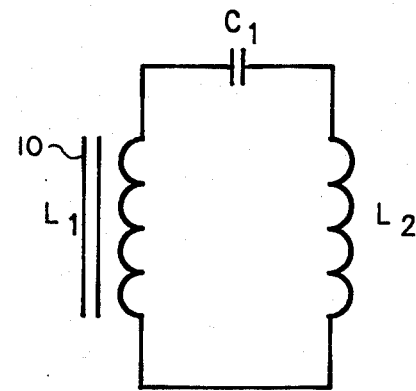
FIG. 1B is an equivalent circuit of the frequency divider of FIG. 1A.

Referring to FIGS. 1A and 1B, one preferred embodiment of the frequency divider of the present invention consists of a nonlinear inductor L1, a second inductor L2 and a capacitance C1, all connected in series with each other to define a series resonant circuit. The values of these components are chosen to define a series resonant circuit that detects electromagnetic radiation at a first predetermined frequency and responds to said detection by transmitting electromagnetic radiation at a second frequency that is a sub-harmonic of the first frequency.

The nonlinear inductor L1 is constructed by closely winding the required number of turns of insulated wire around a core 10 that includes an elongated thin flat ribbon of low-coercivity amorphous magnetic material, such as an alloy sold by Allied-Signal Corporation of Morristown, N.J. that is identified as "METGLAS 2714A". METGLAS is a trademark of Allied-Signal Corporation. In order to achieve the very low demagnetizing factor necessary for operation, the ratio of the overall length of the ribbon 10 to the square root of the cross-sectional area of the ribbon should be at least one-hundred-fifty to one.

The coil of the second inductor L2 is wound around the perimeter of the circuit as shown in FIG. 1A, and is positioned so as not to mutually couple the second inductor L2 to the nonlinear inductor L1.

Figure 2A:
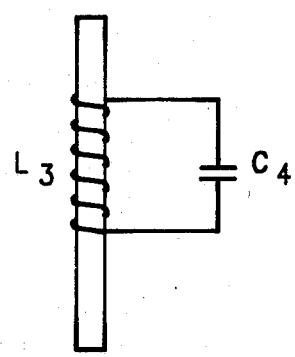
FIG. 2A illustrates an alternative preferred embodiment of the frequency divider of the present invention.
Figure 2B:
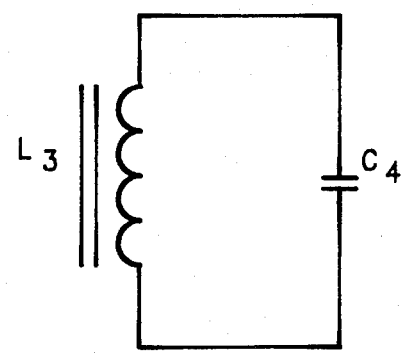
FIG. 2B is an equivalent circuit of the frequency divider of FIG. 2A.

An alternative preferred embodiment of the frequency divider of the present invention is shown in FIGS. 2A and 2B. This embodiment consists of a nonlinear inductor L3 and a capacitance C4 connected in series with each other to define a series resonant circuit. The values of these components are chosen to define a series resonant circuit that detects electromagnetic radiation at a first predetermined frequency and responds to said detection by transmitting electromagnetic radiation at a second frequency that is a sub-harmonic of the first frequency. The nonlinear inductor L3 is constructed in the same manner as the nonlinear inductor L1 in the frequency divider shown in FIGS. 1A and 1B.

The frequency divider of FIG. 2A is not as efficient as the frequency divider of FIG. 1A because of a smaller capture area; but it is simpler and less costly to manufacture.

The following discussion pertains to a possible theory of operation of the frequency divider of the present invention.

FIG. 3A shows the relative amplitude of a waveform H of the electromagnetic radiation at the first predetermined frequency detected by the nonlinear inductor and a waveform I of the current flowing in the resonant circuit of FIG. 1A. FIG. 3B is the corresponding frequency spectrum of the current in the resonant circuit of FIG. 1A. In a similar manner, FIGS. 4A and 4B and 5A and 5B show the result of increasing the amplitude of the interrogating electromagnetic field. The circuit of FIG. 1A undergoes progressive stages of frequency division as a function of the amplitude of the detected electromagnetic radiation at the first predetermined frequency and eventually reaches the chaotic state shown in FIGS. 5A and 5B.

A recent theory by M. J. Feigenbaum published in (M. J. Feigenbaum, J. Stat. Phys. 19, page 25, 1978 and Feigenbaum, J. Stat. Phys. 21, page 665, 1979), regarding nonlinear systems which exhibit period-doubling, predicts that these systems should behave in a universal manner independent of the precise equations which govern their dynamics. In (P. S. Lindsay, Physical Review Letters, Vol. 47, No. 19, pp. 1349–52, November 1981), Lindsay summarizes Feigenbaum's theory as follows:

Consider a system described by the coupled differential equations.

$$dx_i/dt = F_i(X_1, X_2, \ldots, X_n, \lambda), \quad i=1,2,\ldots n, \quad \text{(Eq. 1)}$$

The $X_i(t)$ are periodic with period $T_n = 2^n T_o$ at $\lambda = \lambda_n$. For example in the circuit of FIG. 1A, the $X_i$ correspond to charge and current flowing in the circuit and $\lambda$ is the amplitude of the driving voltage. The theory predicts that the modulation parameter, $\lambda$, should asymptotically satisfy the recurrence relation $$(\lambda_{n+1} - \lambda_n)/(\lambda_{n+2} - \lambda_{n+1}) = \delta \quad \text{(Eq. 2)}$$

$\delta$ is a universal convergence rate that depends only on the nature of $F_i$ near an extremum. For a quadratic extremum $\delta = 4.669\ldots$ when n is large, the odd components of the fourier spectrum are related by $$X^{(n+1)}_{(2k+1)} \approx \frac{1}{2a} [1 - i(-1)^k] \left(1 - i\frac{(-1)^k}{a}\right) X \sum_{k'} \frac{1}{2\pi i} \frac{X(2k'+1)^{(n)}}{(2k'+1) - \frac{1}{2}(2k+1)} \quad \text{(Eq. 3)}$$

The quantity $X_{(2k+1)}^{(n)}$ is the complex fourier amplitude for the frequency $(2k+1)/2^n T_o$ and $a = 2.5029\ldots$ is the universal rescaling factor. Once a fourier component appears at a particular frequency it is predicted that it will remain essentially constant through any succeeding frequency divisions.

Figure 6:
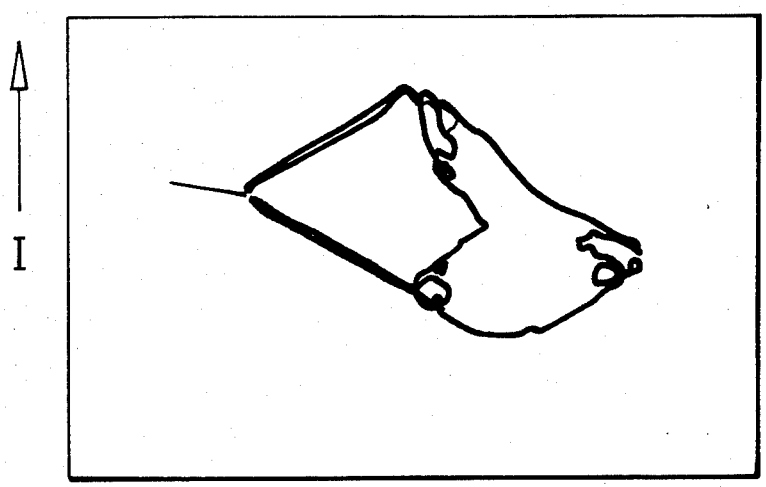
FIG. 6 is a frequency-division bifurcation diagram for the frequency divider of FIG. 1A as observed on an oscilloscope.

FIG. 6 is a typical real-time bifurcation diagram of the resonant circuit of FIG. 1A. This diagram is the result of sampling and displaying the instantaneous current, $i(n*T)$, flowing in the series resonant circuit of FIG. 1A at the beginning of each cycle of the detected electromagnetic radiation at the first predetermined frequency on the Y-axis of an oscilloscope. At the same time the amplitude of the detected electromagnetic radiation at the first predetermined frequency is slowly varied and displayed along the X-axis. The diagram is useful because it clearly reveals threshold values of amplitude for progressive frequency-division bifurcations, convergence rate, rescaling factor, and the onset of chaotic behavior. Bifurcations at f/2, f/4, and f/8 are visible, as well as a window at f/5 in the chaotic region. This behavior may be exploited as a characteristic signature of the invention.

A numerical model has been developed to further analyze the circuit of FIG. 1A. The flux $\Phi_B$, thru the nonlinear inductor L1 is derived from the field generated by the current $i(t)$, flowing thru the coil surrounding it and any external magnetic field, such as the earth's magnetic field. The external steady magnetic field is equivalent to adding a D.C. component to the current flowing in the circuit.

$$i_{eq}(t) = i(t) + i_{dc} \quad \text{(Eq. 4)}$$

This biasing effect adds an asymmetry to the saturation curve of the inductor required for sub-harmonic generation. In the nonlinear inductor L1 of FIG. 1A, the hysterisis effects are small and can be neglected whereby the relationship between $\Phi_B$ and $i_{eq}$ is a single-valued function, to wit:

if $-i_c < i_{eq} < i_c$ then $\Phi_B = M_1 i_{eq}$ \quad (Eq. 5)

if $i_{eq} > i_c$ then $\Phi_B = M_o i_{eq} + (I_{Bs} - M_o i_c)$ \quad (Eq. 6)

if $i_{eq} < -i_c$ then $\Phi_B = M_o i_{eq} - (I_{Bs} - M_o i_c)$ \quad (Eq. 7I)

$\Phi_B$ is the saturation flux; and $i_c$ is the saturation current.

In order to solve the circuit equations we must know $d\Phi_B/dt$ as a function of the current $i_{eq}$. This is accomplished by differentiating the previous equations and substituting $i + i_{dc}$ for $i_{eq}$.

if $-i_c < (i + i_{dc}) < i_c$ then $d\Phi_B/dt = M_1 di/dt$ \quad (Eq. 8)

if $(i + i_{dc}) > i_c$ then $d\Phi_B/dt = M_o di/dt$ \quad (Eq. 9)

if $(i + i_{dc}) < -i_c$ then $d\Phi_B/dt = M_o di/dt$ \quad (Eq. 10)

It is now possible to write the differential equations describing the conditions in the resonant circuit of FIG. 1A as follows:

$E \sin Wt = L_2 di/dt + Ri + M(i)di/dt + V_c$ \quad (Eq. 11)

$i = C dV_c/dt$ \quad (Eq. 12)

W is $2\pi$ times the frequency of the detected electromagnetic radiation at the first predetermined frequency; E is the amplitude of said detected electromagnetic radiation; R is the wire resistance, and $V_c$ is the voltage across the capacitor C1. These are coupled, nonlinear differential equations which may be solved using a numerical technique such as the Runge-Kutta technique to obtain current and voltage as a function of time.

Figure 7:
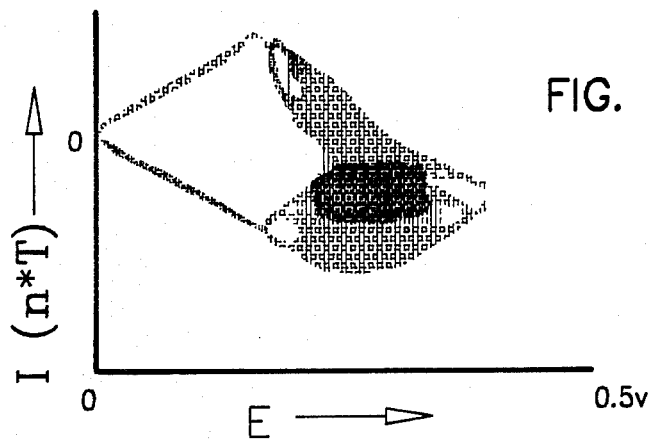
FIG. 7 is a computer generated frequency-division bifurcation diagram based upon a mathematical model of the frequency divider of FIG. 1A.

FIG. 7 is a computer generated bifurcation diagram using this numerical model, wherein $R = 24.4\Omega$, $L2 = 1.28$mh, $C1 = 2.0$ mmf, $W = 8.0$ KHz, $i_{dc} = 1.1$ ma and E varies from 0 to 0.45 volts. Above each value E on the horizontal axis, the 16 values $i(n*T)$, for $n = 25, 26, \ldots, 40$ are reported. We start with $n = 25$ to leave time for the solution to reach a steady state, if there is any. If the steady state is periodic with period $2*T$ then 2 sets of 8 identical points are obtained. This is the first bifurcation. The bias level, $i_{dc}$, was set equal to $i_c$ for this diagram and the result is a very low threshold, with E being approximately equal to 0, for the first bifurcation. This condition is desirable when using the frequency divider of FIG. 1A as a transponder contained within an electronic tag in a presence detection system.

In practice, the circuit of FIG. 1A shows the lowest threshold for bifurcation when the external magnetic bias field is equivalent to the field generated by the saturation current, $i_c$, in the coil wrapped around the amorphous magnetic strip 10 of the nonlinear inductor L1; and the circuit is series resonant at one-half the frequency of the detected electromagnetic radiation at the first predetermined frequency. The biasing magnetic field may simply be the Earth's magnetic field, or a small permanent magnet placed near the nonlinear inductor.

Figure 8:
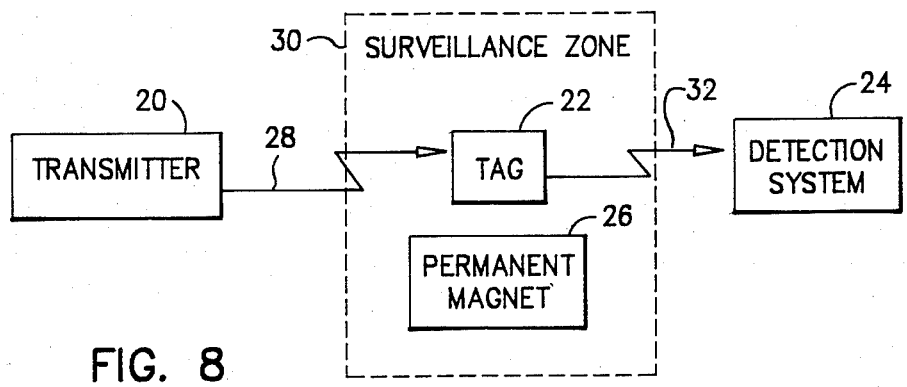
FIG. 8 is a block diagram of a presence detection system including a frequency divider according to the present invention.

This feature is utilized in a preferred embodiment of a presence detection system according to the present invention, as shown in FIG. 8. Such system includes a transmitter 20, an electronic tag 22, a detection system 24 and a permanent magnet 26.

The transmitter 20 transmits an electromagnetic radiation signal 28 of a first predetermined frequency into a surveillance zone 30.

The tag 22 is attached to an article (not shown) to be detected within the surveillance zone 30. The tag 22 includes a batteryless, portable, frequency divider constructed as described above with reference to either FIG. 1A or FIG. 2A.

The permanent magnet 26 provides an external magnetic bias field within the surveillance zone 30 that is equivalent in strength to the magnetic field generated by the saturation current in the coil wound around the core of the nonlinear inductor L1 in the frequency divider in response to the detected electromagnetic radiation at the first predetermined frequency.

The detection system 24 detects electromagnetic radiation at the second frequency in the surveillance zone 30, and thereby detects the presence of the tag 22 in the surveillance zone 30.

The frequency-division bifurcation characteristic of the resonant circuit of FIG. 1A is utilized by causing the transmitter 20 to transmit electromagnetic radiation at the first frequency having an amplitude that causes the resonant circuit to transmit electromagnetic radiation at multiple sub-harmonics of the first frequency. The detection system 24 then must detect electromagnetic radiation 32 in the surveillance zone 30 at each of the multiple sub-harmonics in order to detect the presence of a tag 22 in the surveillance zone 30.

The present invention further provides a batteryless, portable, frequency divider that consists of an elongated thin flat ribbon of low coercivity magnetoelastic amorphous magnetic material that has been annealed in a magnetic field that is transverse to the length of the ribbon and in the the plane of the ribbon, and which detects electromagnetic radiation having a given frequency and responds to the detection of said radiation by transmitting electromagnetic radiation at a subharmonic of the given frequency of the detected radiation. Such frequency divider is included in a tag for use in a presence detection system according to the present invention.

In the preferred embodiment, the frequency-divider ribbon has a characteristic electromagnetic resonant frequency "f", and responds to detection of electromagnetic radiation having a frequency nf, wherein "n" is an even integer, by transmitting electromagnetic radiation at a sub-harmonic of the frequency of the detected radiation. The characteristic electromagnetic resonant frequency of the frequency-divider ribbon is dependent upon the length of the ribbon.

Two examples of amorphous magnetic materials that can be processed to provide an amorphous magnetic material ribbon that exhibits frequency-division characteristics are $Fe_{67}Co_{18}B_{14}Si_1$, which is sold by Allied-Signal Corporation of Morristown, N.J. as METGLAS 2605CO, and $Fe_{81}B_{13.5}Si_{3.5}C_2$, which is sold by Allied-Signal Corporation as METGLAS 2605SC. METGLAS is a trademark of Allied-Signal Corporation. It is also believed that the other amorphous magnetic materials described in Table IV in Anderson, III U.S. Pat. No. 4,553,136 et al. also may be processed to provide a ribbon that exhibits frequency-division characteristics. These materials are $Fe_{82}B_{12}Si_6$ and $Fe_{78}B_{13}Si_9$.

The amorphous magnetic material is processed to provide the frequency-divider ribbon by the following process. First, the material is cut into a long narrow strip so that demagnetizing effects are negligible. The cut ribbon is then annealed in the presence of a magnetic field that is transverse to the length of the ribbon and in the plane of the ribbon. A ribbon that has been so processed is referred to herein as a "frequency-divider ribbon." This process creates a uniaxial magnetic anisotropy that is necessary for a large interaction between stress and strain and the orientation of the magnetic moment.

It is believed that energy is stored mechanically in the vibrations of the frequency-divider ribbon; whereas in the embodiments of FIGS. 1A and 2A, energy is stored in a capacitor. Consequently, frequency division can be acheived by the frequency-divider ribbon alone and apart from any other resonant-circuit components.

The frequency-divider ribbon has a characteristic mechanical resonant frequency that is is expressed by the equation:

$$f_m = c^H/2L \qquad (Eq.\ 13)$$

wherein "L" is the length of the ribbon and C is the speed of sound in the ribbon.

$$c^H = \sqrt{1/pS_{33}^H} \qquad (Eq.\ 14)$$

wherein p is the density of the material and $S_{33}^H$ is the elastic constant of the ribbon material and is dependent upon the strength of any external magnetic bias field applied to the ribbon.

The characteristic electromagnetic resonant frequency of the frequency-divider ribbon is independent of the the characteristic mechanical resonant frequency of the ribbon and appears to be relatively independent of the strength of any external magnetic bias field, except that frequency division does not occur unless an external magnetic bias field of at least a predetermined strength is applied to the frequency divider ribbon.

In one example, METGLAS 2605SC material was cut into ribbons that were approximately 10 cm by 0.2 cm. The material had a thickness, as cast, in a range of about 25 to 38 microns.

These ribbons then were annealed in a transverse magnetic field of approximately 5000 Oersteds for ten minutes at approximately 370 degrees Centigrade. The ribbons then were allowed to cool to the ambient temperature with the 5000 Oersted magnetic field still applied.

The resultant frequency-divider ribbon was observed to have a characteristic mechanical resonant frequency of approximately 10 KHz when an external magnetic bias field of 0.55 Oersteds was applied thereto. For an external magnetic bias field strength of 0.6 Oersteds, the characteristic mechanical resonant frequency of the ribbon was approximately 9.4 KHz. As the strength of the applied field was increased above 0.6 Oersteds, the characteristic mechanical resonant frequency of the ribbon also increased. During these variations in the applied external magnetic bias field, the characteristic electromagnetic resonant frequency of the frequency-divider ribbon remained relatively unchanged at approximately 2 KHz. However, the amplitude of the signal transmitted by the frequency-divider ribbon at the subharmonic frequency was dependent upon the strength of the applied external magnetic bias field. The highest amplitude of the subharmonic signal was observed when the strength of the applied external magnetic bias field was approximately the same as the strength of the transmitted signal detected by the frequency-divider ribbon and the frequency of the detected transmitted signal was approximately twice the characteristic mechanical resonant frequency of the frequency-divider ribbon.

Frequency division was observed at even-numbered multiples of the characteristic electromagnetic resonant frequency of the frequency-divider ribbon. For example, the frequency-divider ribbon responded to a 4 KHz signal by transmitting a 2 KHz signal; responded to an 8 KHz signal by transmitting a 4 KHz signal; responded to a 12 KHz signal by transmitting a 6 KHz signal; etc. Subharmonics at one-half the frequency of detected transmitted signals having frequencies other than nf also were observed, but at significantly lower amplitudes.

With a 0.55 Oersted external magnetic bias field applied to the frequency-divider ribbon to produce a 10 KHz characteristic mechanical resonant frequency therein, the highest amplitude subharmonic signal observed was the 10 KHz signal transmitted by the frequency-divider ribbon in response to detection of a 20 KHz transmitted signal.

The frequency-divider ribbon is included in the tag 22 in the presence detection system of FIG. 8, described above, in place of the frequency divider of FIG. 1A or FIG. 2A. The strength of the external magnetic bias field applied by the permanent magnet 26 is approximately the same as the strength of the electromagnetic radiation signal 28 transmitted into the surveillance zone by the transmitter 20. The frequency of the electromagnetic radiation signal 28 transmitted by the transmitter 20 is approximately twice the characteristic mechanical resonant frequency of the frequency-divider ribbon. The frequency-divider ribbon in the tag 22 detects the transmitted electromagnetic signal 28 and responds thereto by transmitting a signal 32 at a subharmonic of the frequency of the transmitted signal 28. The detection system 24 is tuned to detect a subharmonic, preferably one-half, of the frequency of the transmitted signal 28 to thereby detect the presence of the tag 22 in the surveillance zone 30. In some locations and with some frequency-divider ribbons, the strength of the Earth's magnetic field may be adequate to provide the external magnetic bias field in the surveillance zone 30, whereby the permanent magent 26 may be omitted.

In an alternative embodiment, the tag includes a plurality of frequency-divider ribbons of different lengths, which thereby have different characteristic electromagnetic resonant frequencies. Different combinations of frequency-divider ribbons are included in different tags to thereby provide uniquely coded tags. To detect the presence of a coded tag 22 in the surveillance zone 30, the transmitter 20 provides a transmitted signal 28 that is swept over a predetermined range of frequencies that includes each of the frequencies that are twice the characteristic electromagnetic resonant frequency of each of the frequency-divider ribbons; and the detection system 24 detects signals at each of the characteristic electromagnetic resonant frequencies to detect the presence of the tag 22 in the surveillance zone 30.

In another alternative embodiment, the detection system 24 detects an acoustic wave at the characteristic mechanical resonant frequency of the frequency-divider ribbon to detect the presence of the tag 22 in the surveillance zone 30.

We claim:

1. A batteryless, portable, frequency divider, consisting of
   a single resonant circuit comprising
   a nonlinear inductor having a core made of amorphous magnetic material; and
   a capacitance connected in series with the inductor to define a resonant circuit that detects electromagnetic radiation at a first predetermined frequency and responds to said detection by transmitting electromagnetic radiation at a second frequency that is a sub-harmonic of the first frequency.

2. A frequency divider according to claim 1, wherein the resonant circuit further comprises a second inductor connected in series with the nonlinear inductor and the capacitance to define the resonant circuit and having a coil that is positioned so that the second inductor is not mutually coupled to the nonlinear inductor.

3. A frequency divider according to claim 2, wherein the coil of the second inductor is wound around the perimeter of the circuit.

4. A frequency divider according to claim 3, wherein the resonant circuit consists of said nonlinear inductor, said capacitance and said second inductor.

5. A frequency divider according to claim 2, wherein the resonant circuit consists of said nonlinear inductor, said capacitance and said second inductor.

6. A frequency divider according to claim 1, wherein the resonant circuit consists of said nonlinear inductor and said capacitance.

7. A frequency divider according to claim 1, wherein the core of the nonlinear inductor comprises an elongated thin flat ribbon of low-coercivity amorphous magnetic material.

8. A frequency divider according to claim 7, wherein the ratio of the length of the ribbon to the square root of the cross-sectional area of the ribbon is at least one-hundred-fifty to one.

9. A frequency divider according to claim 8, wherein the resonant circuit consists of said nonlinear inductor and said capacitance.

10. A frequency divider according to claim 7, wherein the resonant circuit consists of said nonlinear inductor and said capacitance.

11. A frequency divider according to claim 7, wherein the resonant circuit consists of said nonlinear inductor, said capacitance and a second inductor connected in series therewith and having coil that is positioned so that the second inductor is not mutually coupled to the nonlinear inductor.

12. A frequency divider according to claim 11, wherein the ratio of the length of the ribbon to the square root of the cross-sectional area of the ribbon is at least one-hundred-fifty to one.

13. A frequency divider according to claim 12, wherein the coil of the second inductor is wound around the perimeter of the circuit.

14. A presence detection system, comprising
   means for transmitting an electromagnetic radiation signal of a first predetermined frequency into a surveillance zone;
   a tag for attachment to an article to be detected within the surveillance zone, comprising a batteryless, portable, frequency divider consisting of a single resonant circuit comprising a nonlinear inductor having a coil wound around a core made of amorphous magnetic material; and a capacitance connected in series with the inductor to define a resonant circuit that detects electromagnetic radiation at the first predetermined frequency and responds to said detection by transmitting electromagnetic radiation at a second frequency that is a sub-harmonic of the first frequency;
   means for providing an external magnetic bias field within the surveillance zone that is equivalent in strength to the magnetic field generated by the saturation current in the coil wound around the core of the nonlinear inductor in response to the detected electromagnetic radiation at the first predetermined frequency; and means for detecting electromagnetic radiation at the second frequency in the surveillance zone.

15. A system according to claim 14, wherein the means for providing the external bias field includes a permanent magnet.

16. A system according to claim 14, wherein the resonant circuit has a frequency-division characteristic with respect to the amplitude of the electromagnetic radiation at the first frequency such that when the amplitude exceeds a predetermined threshold, the resonant circuit transmits multiple sub-harmonics of the first frequency;

wherein the transmitting means is adapted for transmitting electromagnetic radiation that exceeds said predetermined amplitude threshold within the surveillance zone; and wherein the detecting means are adapted for detecting said multiple sub-harmonics in the surveillance zone to thereby detect the presence of the tag within the surveillance zone.

17. A presence detection system, comprising means for transmitting an electromagnetic radiation signal of a first predetermined frequency into a surveillance zone;

a tag for attachment to an article to be detected within the surveillance zone, comprising a batteryless, portable, frequency divider consisting of a resonant circuit comprising a nonlinear inductor having a core made of amorphous magnetic material; and a capacitance connected in series with the inductor to define a resonant circuit that detects electromagnetic radiation at the first predetermined frequency and responds to said detection by transmitting electromagnetic radiation at a second frequency that is a sub-harmonic of the first frequency; and means for detecting electromagnetic radiation at the second frequency in the surveillance zone.

18. A system according to claim 17, wherein the resonant circuit further comprises a second inductor connected in series with the nonlinear inductor and the capacitance to define the resonant circuit and having a coil that is positioned so that the second inductor is not mutually coupled to the nonlinear inductor.

19. A system according to claim 18, wherein the resonant circuit consists of said nonlinear inductor, said capacitance and said second inductor.

20. A system according to claim 19, wherein the core of the nonlinear inductor comprises an elongated thin flat ribbon of low-coercivity amorphous magnetic material.

21. A system according to claim 17, wherein the resonant circuit consists of said nonlinear inductor and said capacitance.

22. A system according to claim 21, wherein the core of the nonlinear inductor comprises an elongated thin flat ribbon of low-coercivity amorphous magnetic material.

23. A system according to claim 17, wherein the resonant circuit has a frequency-division characteristic with respect to the amplitude of the electromagnetic radiation at the first frequency such that when the amplitude exceeds a predetermined threshold, the resonant circuit transmits multiple sub-harmonics of the first frequency;

wherein the transmitting means is adapted for transmitting electromagnetic radiation that exceeds said predetermined amplitude threshold within the surveillance zone; and wherein the detecting means are adapted for detecting said multiple sub-harmonics in the surveillance zone to thereby detect the presence of the tag within the surveillance zone.

24. A batteryless, portable, frequency divider, consisting of an elongated thin flat ribbon of low coercivity magnetoelastic amorphous magnetic material that has been annealed in a magnetic field that is transverse to the length of the ribbon and in the the plane of the ribbon, which has a characteristic electromagnetic resonant frequency "f", and which detects electromagnetic radiation having a given frequency nf, wherein "n" is an even integer, and responds to the detection of said radiation by transmitting electromagnetic radiation at a subharmonic of the given frequency of the detected radiation.

25. A frequency divider according to claim 24, wherein the subharmonic is one-half nf.

26. A frequency divider according to claim 24, wherein the material is selected from a group consisting of $Fe_{67}Co_{18}B_{14}Si_1$, $Fe_{81}B_{13.5}Si_{3.5}C_2$, $Fe_{82}B_{12}Si_6$, and $Fe_{78}B_{13}Si_9$.

27. A presence detection system, comprising means for transmitting an electromagnetic radiation signal of a first predetermined frequency nf into a surveillance zone;

a tag for attachment to an article to be detected within the surveillance zone, comprising a batteryless, portable, frequency divider consisting of an elongated thin flat ribbon of low coercivity magnetoelastic amorphous magnetic material that has been annealed in a magnetic field that is transverse to the length of the ribbon and in the the plane of the ribbon, which has a characteristic electromagnetic resonant frequency "f", and which detects electromagnetic radiation having the frequency nf, wherein "n" is an even integer, and responds to the detection of said radiation by transmitting electromagnetic radiation at a sub-harmonic of the frequency of the detected radiation;

means for providing an external magnetic bias field within the surveillance zone of sufficient strength to cause the ribbon to frequency divide; and means for detecting electromagnetic radiation at the subharmonic frequency in the surveillance zone.

28. A system according to claim 27, wherein the subharmonic is one-half nf.

29. A system according to claim 27, wherein the material is selected from a group consisting of $Fe_{67}Co_{18}B_{14}Si_1$, $Fe_{81}B_{13.5}Si_{3.5}C_2$, $Fe_{82}B_{12}Si_6$, and $Fe_{78}B_{13}Si_9$.

30. A batteryless, portable, frequency divider, consisting of an elongated thin flat ribbon of low coercivity magnetoelastic amorphous magnetic material that has been annealed in a magnetic field that is transverse to the length of the ribbon and in the the plane of the ribbon, and which detects electromagnetic radiation having a given frequency and responds to the detection of said radiation by transmitting electromagnetic radiation at a subharmonic of the given frequency of the detected radiation.

31. A frequency divider according to claim 30, wherein the subharmonic is one-half the frequency of the detected radiation.

32. A frequency divider according to claim 30, wherein the material is selected from a group consisting of $Fe_{67}Co_{18}B_{14}Si_1$, $Fe_{81}B_{13.5}Si_{3.5}C_2$, $Fe_{82}B_{12}Si_6$, and $Fe_{78}B_{13}Si_9$.

33. A presence detection system, comprising
means for transmitting an electromagnetic radiation signal of a first predetermined frequency nf into a surveillance zone;
a tag for attachment to an article to be detected within the surveillance zone, comprising a batteryless, portable, frequency divider consisting of an elongated thin flat ribbon of low coercivity magnetoelastic amorphous magnetic material that has been annealed in a magnetic field that is transverse to the length of the ribbon and in the the plane of the ribbon, and which which detects electromagnetic radiation having the first frequency and responds to the detection of said radiation by transmitting electromagnetic radiation at a sub-harmonic of the frequency of the detected radiation;
means for providing an external magnetic bias field within the surveillance zone of sufficient strength to cause the ribbon to frequency divide; and
means for detecting electromagnetic radiation at the subharmonic frequency in the surveillance zone.

34. A system according to claim 33, wherein the subharmonic is one-half the frequency of the detected radiation.

35. A system according to claim 33, wherein the material is selected from a group consisting of $Fe_{67}Co_{18}B_{14}Si_1$, $Fe_{81}B_{13.5}Si_{3.5}C_2$, $Fe_{82}B_{12}Si_6$, and $Fe_{78}B_{13}Si_9$.

36. A coded tag for attachment to an article to be detected within a surveillance zone, comprising
a plurality of a batteryless, portable, frequency dividers, each of which consists of an elongated thin flat ribbon of low coercivity magnetoelastic amorphous magnetic material that has been annealed in a magnetic field that is transverse to the length of the ribbon and in the the plane of the ribbon, which has a characteristic electromagnetic resonant frequency "f", and which detects electromagnetic radiation having the frequency nf, wherein "n" is an even integer, and responds to the detection of said radiation by transmitting electromagnetic radiation at a sub-harmonic of the frequency of the detected radiation;
wherein the ribbons of the respective frequency dividers are of different lengths and thereby have different characteristic electromagnetic resonant frequencies.

37. A tag according to claim 36, wherein the subharmonic is one-half nf for each of the respective frequency dividers.

38. A tag according to claim 36, wherein the material is selected from a group consisting of $Fe_{67}Co_{18}B_{14}Si_1$, $Fe_{81}B_{13.5}Si_{3.5}C_2$, $Fe_{82}B_{12}Si_6$, and $Fe_{78}B_{13}Si_9$.

* * * * *